(12) United States Patent
Emerson et al.

(10) Patent No.: US 7,447,818 B2
(45) Date of Patent: **\*Nov. 4, 2008**

(54) SYSTEM AND METHOD FOR CONTROLLING REMOTE CONSOLE FUNCTIONALITY ASSIST LOGIC

(75) Inventors: Theodore F. Emerson, Houston, TX (US); Siamak Tavallaei, Spring, TX (US); John V. Butler, The Woodlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 690 days.

This patent is subject to a terminal disclaimer.

(21) Appl. No.: 10/716,144

(22) Filed: Nov. 18, 2003

(65) Prior Publication Data

US 2005/0010696 A1 Jan. 13, 2005

Related U.S. Application Data

(63) Continuation of application No. 10/108,106, filed on Mar. 27, 2002, now Pat. No. 6,742,066, which is a continuation of application No. 09/313,220, filed on May 17, 1999, now Pat. No. 6,385,682, application No. 10/716,144, which is a continuation-in-part of application No. 09/140,040, filed on Aug. 26, 1998, now Pat. No. 6,173,341, and a continuation-in-part of application No. 09/105,725, filed on Jun. 25, 1998, now Pat. No. 6,098,143, and a continuation-in-part of application No. 09/098,015, filed on Jun. 15, 1998, now Pat. No. 6,141,708, and a continuation-in-part of application No. 08/988,345, filed on Dec. 10, 1997, now Pat. No. 6,212,587, and a continuation-in-part of application No. 08/733,254, filed on Oct. 18, 1996, now Pat. No. 6,476,854.

(51) Int. Cl.
*G06F 15/16* (2006.01)
*G06F 3/00* (2006.01)

(52) U.S. Cl. .................. 710/260; 710/48; 710/129; 709/219

(58) Field of Classification Search ............. 710/46–50, 710/100–101, 126–130, 260–269; 709/217–219, 709/223

See application file for complete search history.

(56) References Cited

U.S. PATENT DOCUMENTS 5,062,059 A * 10/1991 Youngblood et al. ........ 709/217
5,257,384 A    10/1993 Farrand et al.
5,272,384 A    12/1993 Kochert (Continued)

OTHER PUBLICATIONS

Mendel, Brett; "Server I/O All Set to Flow;" Lantimes, Oct. 27, 1997, vol. 14, Issue 22; cover page and p. 31.

(Continued)

*Primary Examiner*—Christopher B. Shin

(57) ABSTRACT

A computer system, such as a server disposed in an enterprise, accessible from a remote terminal for remote management applications. The computer system includes a remote console functionality assist logic structure for effectuating the sending and receiving of signals from the remote terminal. The remote console functionality assist logic structure is controlled by a dedicated processor that receives interrupts therefrom in response to a remote management application. The processor can also control one or more peripheral devices provided in the computer system, wherein the controlled peripheral device or devices are disposed up-stream or down-stream from the processor.

50 Claims, 4 Drawing Sheets

U.S. PATENT DOCUMENTS

| | | | |
|---|---|---|---|
| 5,283,905 | A | 2/1994 | Saadeh et al. |
| 5,309,563 | A | 5/1994 | Farrand et al. |
| 5,367,641 | A | 11/1994 | Pressprich et al. |
| 5,367,670 | A | 11/1994 | Ward et al. |
| 5,369,617 | A * | 11/1994 | Munson .................. 365/219 |
| 5,402,431 | A | 3/1995 | Saadeh et al. |
| 5,410,706 | A | 4/1995 | Farrand et al. |
| 5,440,699 | A | 8/1995 | Farrand et al. |
| 5,444,849 | A | 8/1995 | Farrand et al. |
| 5,479,648 | A * | 12/1995 | Barbera et al. ............ 713/322 |
| 5,561,822 | A * | 10/1996 | Ham ......................... 710/36 |
| 5,592,676 | A | 1/1997 | Bonnafoux |
| 5,764,886 | A | 6/1998 | Danielson et al. |
| 5,790,895 | A | 8/1998 | Krontz et al. |
| 5,812,144 | A * | 9/1998 | Potu et al. ................ 715/500.1 |
| 5,852,720 | A | 12/1998 | Gready et al. |
| 5,857,074 | A | 1/1999 | Johnson |
| 5,898,861 | A | 4/1999 | Emerson et al. |
| 5,993,614 | A | 11/1999 | Nomura |
| 6,067,527 | A | 5/2000 | Lovell et al. |
| 6,070,253 | A | 5/2000 | Tavallae et al. |
| 6,098,143 | A | 8/2000 | Humpherys et al. |
| 6,128,690 | A | 10/2000 | Purcell et al. |
| 6,134,613 | A * | 10/2000 | Stephenson et al. ......... 710/313 |
| 6,141,708 | A | 10/2000 | Tavallaei et al. |
| 6,173,340 | B1 | 1/2001 | Gready et al. |
| 6,173,341 | B1 | 1/2001 | Emerson et al. |
| 6,212,587 | B1 | 4/2001 | Emerson et al. |
| 6,226,699 | B1 | 5/2001 | Humpherys et al. |
| 6,233,634 | B1 | 5/2001 | Clark et al. |
| 6,321,287 | B1 * | 11/2001 | Rao et al. .................. 710/260 |
| 6,385,682 | B1 * | 5/2002 | Emerson et al. ............ 710/260 |
| 6,473,795 | B1 | 10/2002 | Danielson et al. |
| 6,476,854 | B1 * | 11/2002 | Emerson et al. ............ 348/143 |
| 6,742,066 | B2 * | 5/2004 | Emerson et al. ............ 710/260 |

OTHER PUBLICATIONS

Briggs, Chris; "Smarter and Faster I/O for Servers;" Core: Operating Systems; Byte, May 1, 1996, vol. 2, No. 5.

Thompson, Tom; "I2O Beats I/O Bottlenecks;" Byte, Aug. 1997, pp. 85, 86 and 3 additional pages.

I2O Introduction; Technology Backgrounder; Aug. 13, 1997; http://www.i2osig.org/Architecture/TechBack.html.

I960 RP I/O Processor-the I2O SIG site; http://134.134.214.1/design/iio/i2osig.html; Feb. 6, 1998.

"Welcome to the I2O SIG Web Site!"; http://www.i2osig.org; F bruary 6, 1998.

"About I2O Technology"; http://www.i2osig.org/Architecture; Feb. 6, 1998.

"Technology Backgrounder"; http://www.i2osig.org/Architecture/TechBack.html; Feb. 6, 1998; 6 pages.

"Questions and Answers"; http://www.i2osig.org/Architecture/QandA.html; Feb. 6, 1998; 4 pages.

"I2O Specifications For Non-Members"; http://www.i2osig.org/Architecture/GetSpec.html; Feb. 6, 1998.

Amdahl, Carlton G.; "I2O Future Directions"; http://www.i2osig.org; Jun. 1996; 12 pages.

Goble, Scott, et al.; "Intelligent I/O Architecture"; http://www.i2osig.org; Jun. 1996; 22 pages.

"Press Releases and Clips"; http://www.i2osig.org/Press; Feb. 6, 1998; 4 pages.

Listing of Press Releases; http://altavista.digital.com/cgi-bin/quer ,21%2FMar%2F86&d1=&search.x=46&search.y=6; Feb. 6, 1998; 2 pages.

Crothers, Brooke; "Intel server chip gets big backing"; Oct. 7, 1997; http://www.news.com/News/Item/0,4,14962,00.html; Feb. 6, 1998.

"HP Demonstrates Commitment to I2O Standard With New I2O Disk-array Controller"; Hewlett Packard; Press Release, Atlanta, Oct. 8, 1997; http://hpcc920.external.hp.com/pressrel/oct97/08oct97b.html; Feb. 6, 1998; 2 pages.

"I2O: Disaster in the making for the freeware community"; http://22.kenandted.com/i2o/disaster.html; Feb. 6, 1998; 2 pages.

* cited by examiner

SYSTEM AND METHOD FOR CONTROLLING REMOTE CONSOLE FUNCTIONALITY ASSIST LOGIC

CROSS-REFERENCE TO RELATED APPLICATIONS

This is a continuation of U.S. patent application Ser. No. 10/108,106 filed on Mar. 27, 2002 now U.S. Pat. No. 6,742,066, which is a continuation of U.S. patent application Ser. No. 09/313,220, filed on May 17, 1999 now U.S. Pat. No. 6,385,682. This application is also a continuation-in-part of the following applications: U.S. patent application Ser. No. 08/733,254, filed on Oct. 18, 1996, which issued as U.S. Pat. No. 6,476,854 on Nov. 5, 2002; U.S. patent application Ser. No. 09/105,725, filed on Jun. 25, 1998, which issued as U.S. Pat. No. 6,098,143 on Aug. 1, 2000; U.S. patent application Ser. No. 08/988,345, filed on Dec. 10, 1997, which issued as U.S. Pat. No. 6,212,587 on Apr. 3, 2001; U.S. patent application Ser. No. 09/140,040, filed on Aug. 26, 1998, which issued as U.S. Pat. No. 6,173,341 on Jan. 9, 2001; and U.S. patent application Ser. No. 09/098,015, filed on Jun. 15, 1998, which issued as U.S. Pat. No. 6,141,708 on Oct. 31, 2000.

This application hereby incorporates by reference the following co-assigned patent applications which describe related subject matter: U.S. patent application Ser. No. 08/733,254, entitled "Video Eavesdropping and Reverse Assembly to Transmit Video Action to a Remote Console," (Inventors: Theodore F. Emerson, Peter J. Michaels and Jeoff M. Krontz); U.S. patent application Ser. No. UNKNOWN, entitled "Remote Server Management Device," (Inventors: Brian Humpherys, John Butler, Siamak Tavallaei, Theodore F. Emerson and Doron Chosnek); U.S. patent application Ser. No. 09/086,690, entitled "Method, System, and Apparatus for Intelligent Input/Output Device Driver Translation, and Emulation," filed May 28, 1998 (Inventor: Theodore F. Emerson); U.S. patent application Ser. No. 08/988,345, entitled "Device Proxy Agent for Hiding Computing Devices on a Computer Bus," filed Dec. 10, 1997 (Inventors: Theodore F. Emerson and Christopher J. McCarty); U.S. patent application Ser. No. 09/140,040, entitled "System and Method for Assigning and Controlling Adapters in a Computer System," (Inventors: Theodore F. Emerson and Christopher J. McCarty); and U.S. patent application Ser. No. 09/098,015, entitled "System and Method for Hiding Peripheral Devices on a Bus," filed Jun. 15, 1998 (Inventors: Siamak Tavallaei, Brian T. Purcell and Brian S. Hausauer).

BACKGROUND OF THE INVENTION

1. Field of the Invention

The present invention relates generally to computer systems, and more particularly, to systems and methods for controlling remote console functionality assist logic devices that are used for accessing computer systems from remote locations.

2. Description of Related Art

An overwhelming trend affecting the server marketplace today is the growth of the distributed enterprise. As a result of the server proliferation throughout an enterprise, customers are demanding high-availability solutions that reduce or eliminate downtime whenever possible. One method of achieving high availability is through the use of effective server management tools.

As can be readily appreciated, how a server will be accessed as well as the management functions that are to be performed are important considerations in determining appropriate server management tools. A server can be accessed in different ways, depending on connection method and server state. A server can be connected to other computers and devices through either an "in-band" connection or an "out-of-band" connection. In the context of the present patent application, an in-band connection refers to the communication connection that is made with the primary communication device for normal use by the server when it is not down. For example, it may be a network connection established through a medium such as a twisted pair 10 Base-T that is available for normal and customary access to the server. On the other hand, an out-of-band connection may be envisaged as a "backdoor" communication connection that is established when the server is down, that is, the server is not accessible through its normal, customary access means. The out-of-band connection can some times be viewed as an asynchronous connection also.

Once a connection is made to the server, a system administrator may need to use different server management tools, depending on whether the server is on line or offline. An on line server refers to one in which the Operating System (OS) is up and running. If the OS is down, the server is considered offline.

Remote server management devices have been used to facilitate remote access and administration of server computer systems in the event of a failure. Server failures may arise on account of several possibilities such as, for example, faults associated with the server OS, malfunctioning of one or more central processing units, network-related and power-related faults, et cetera. Typically, in such eventualities, normal access to the server and its internal diagnostic subsystems is lost. Accordingly, it is common to provide remote console functionality within servers to be able to access the failed server from a remote device.

The remote console functionality is typically designed to allow a user to access a server from another computer, or device, known as a management console, as though the user is at the server. Logic, which can be implemented as certain hardware and firmware modules, is provided to assist and realize such functionality. Henceforth, such logic will be referred to as "remote console functionality assist" logic. Such assist logic can include a video encoder and a keyboard interface logic that allows the user to input data to the server from a keyboard at the remote terminal. The video encoder, in combination with the server video controller, allows the user to receive output from the server on a display, such as a monitor, at the remote terminal.

The remote console functionality is advantageous because the user is provided with video and keyboard access, even where the Operating System of the server is down. The user therefore has the ability to access the server, perform diagnostics, reset the server, watch the reset process remotely, and view previously stored console activity, regardless of whether the server Operating System is on line or offline.

The remote console functionality assist logic can also include out-of-band connection logic such as, for example, modem sharing logic. Such logic allows an asynchronous connection to be established between the server and a remote terminal. It can be appreciated that while remote console functionality can comprise discrete logic modules, it may often be implemented as an Application Specific Integrated Circuit (ASIC) also, giving rise to such structures as are known as Integrated Remote Console (IRC) devices.

Conventionally, the hardware of the remote console functionality assist logic is operated under the control of the server system processor or processors. Because of this arrangement, the hardware of the remote console functionality is often considered as "slave hardware." The system processor controls the hardware of the remote console logic by executing software in the system management mode (SMM) invoked by a system management interrupt (SMI).

Several current remote server management solutions utilize the SMM-based scheme described above. However, these solutions are known to have several drawbacks and shortcomings. Because these devices are under the control of the system processor or processors, a portion of the processing capacity of the computer system is diverted. To minimize the processing capacity diversion, the functionality associated with the remote control software executed by the processor is typically provided to be rather rudimentary in nature. For example, the software does not include features such as a security layer. Advanced functionalities such as networking protocols (for example, the Point-to-Point Protocol) that are capable of multiple sessions, TELNET connections, et cetera, accordingly, are also not practical in current systems. Of course, while the system processor can execute more advanced software to control the remote console functionality hardware, providing such advanced software results in increased degradation of the processing power of the computer system.

Another drawback is that current remote server management devices depend on the proper functioning of the processors of the server computer system. However, if the processors of the computer system are not functioning, or malfunctioning, the remote console functionality is rendered inoperable. Therefore, the computer system will be inaccessible during such situations. Because the remote console functionality is used for troubleshooting a failed server, reliance on proper functioning of the processors thereof is not desirable.

A further drawback is that the access to the server system with current remote console functionality solutions is typically limited to a rather simple connection such as a modem connection. In a large enterprise computer system, it is highly cumbersome to provide at a server site for numerous modem/telephone connections. It is more preferable to have network connections, on the other hand, because of the speed and manageability.

Advanced remote server management solutions such as dedicated management subsystems/cards have been proposed which address some of the drawbacks described above. However, these advanced solutions are substantially expensive and suffer from an additional shortcoming of not being hot-pluggable. Accordingly, it should be readily appreciated that the use of such solutions will typically increase system downtime when devices embodying them need service or maintenance, thereby negatively impacting server availability.

The present invention, described and claimed hereinbelow, is directed to remote server management solutions that overcome these and other shortcomings and deficiencies of the extant systems.

SUMMARY OF THE INVENTION

The present invention provides a cost-effective remote server management solution that is highly versatile and expandable by virtue of a dedicated processor for controlling the remote console functionality assist logic. Further, by segmenting certain portions of the assist logic the remote console functionality may be rendered hot-pluggable. Furthermore, because of the increased processing power that is available, advanced features may be provided in the overall remote console functionality.

The present invention, accordingly, is directed to a computer system with a plurality of peripheral devices disposed on a bus, which computer system comprises: a remote console functionality assist logic structure disposed on the bus for effectuating remote system management applications relating to the computer system; and a processor for controlling at least one of the remote console functionality assist logic structure and one of the plurality of peripheral devices, wherein the processor receives interrupts from the remote console functionality assist logic structure responsive to one of the remote system management applications.

In a further aspect, the present invention is related to a computer system, comprising: a first peer Input/Output (I/O) bus for interconnecting a first plurality of devices and a first plurality of expansion slots; a second peer I/O bus for interconnecting a second plurality of devices and a second plurality of expansion slots; and an expansion board comprising a processor, the board disposed in one of the second plurality of expansion slots, the board further having a connector for facilitating the transmission of control signals associated with the processor, wherein the second plurality of devices includes a remote console functionality assist logic structure, which structure is controlled by the processor.

In a yet further aspect, the present invention is directed to a method of remotely monitoring a computer system, comprising the steps of: providing a remote console functionality assist logic structure associated with the computer system; establishing a connection between the computer system and a remote terminal; and controlling the remote console functionality assist logic structure by an Input/Output processor.

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various embodiments of the claimed invention. Moreover, some statements may apply to some inventive features but not to others.

Figure 1:
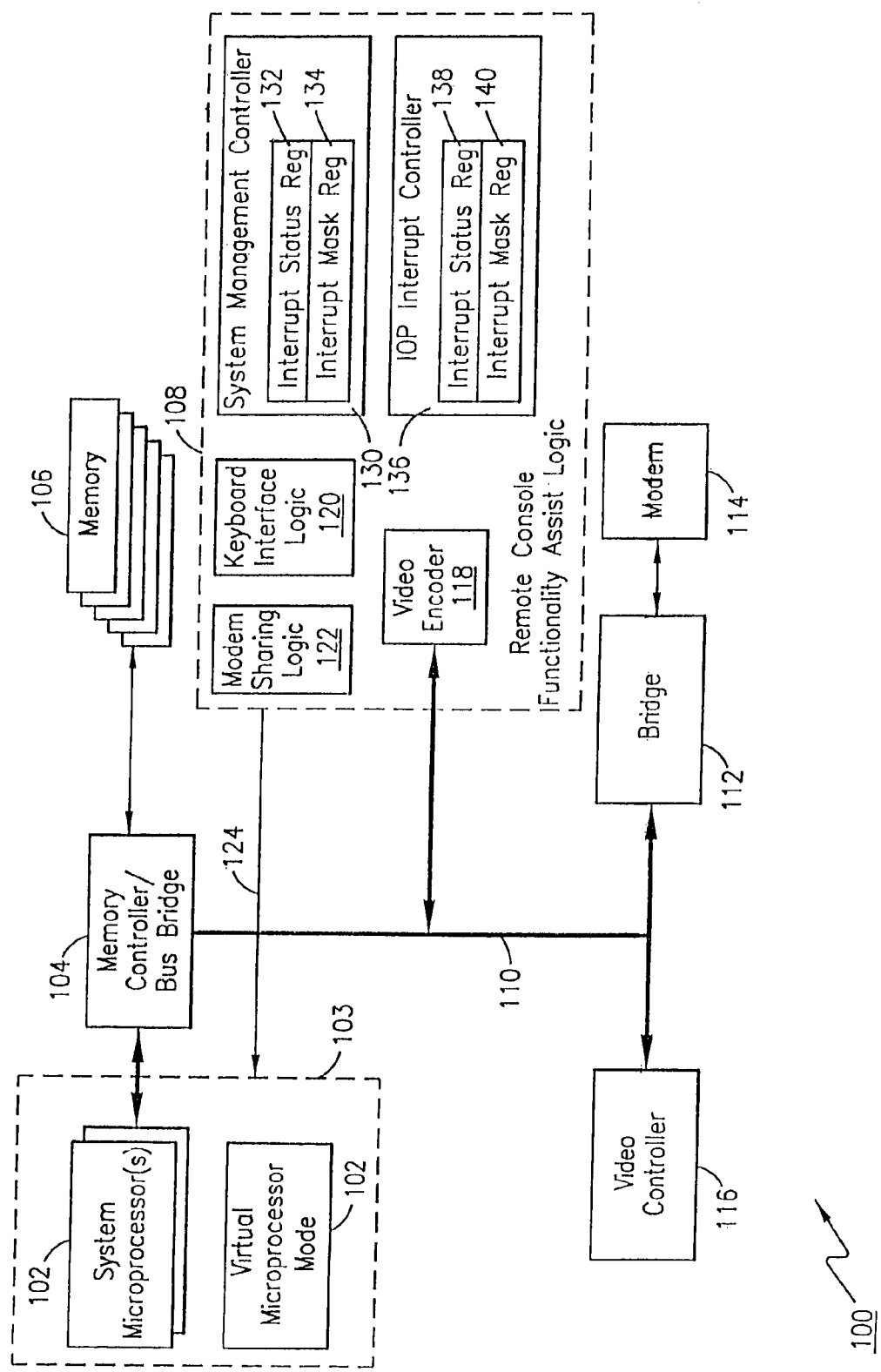
FIG. 1 is a block diagram of an exemplary conventional server computer system including a typical implementation of remote console functionality assist logic.

Referring now to the Drawings wherein like or similar elements are designated with identical reference numerals throughout the several views, and wherein the various elements depicted are not necessarily drawn to scale, and more particularly to FIG. 1, a block diagram of an exemplary conventional server computer system 100 including an assist logic block 108 for providing remote server management functionality. One or more system microprocessors (or central processing units) 102 are conventionally coupled to a block of system memory 106. This coupling is facilitated by way of a block 104 having memory controller and bus bridge functionality. Block 104 is designed to couple a host bus to a first Input/Output (I/O) bus 110 such as a Peripheral Component Interconnect (PCI) bus. A bus-to-bus bridge 112 couples the first I/O bus 110 to a second I/O bus, such as an Extended Industry Standard Architecture (EISA) bus to which a modem controller device 114 may be attached. A video controller 116 is disposed on the first I/O bus 110 for controlling the video display functionality associated with the system 100. The remote console functionality assist logic block 108 is operably coupled to the first I/O bus 110 for effectuating remote server management functions typically through an out-of-band connection via the modem controller device 114. It should be understood that the logic block 108 may typically be implemented as an integrated remote console (IRC) ASIC.

Continuing to refer to FIG. 1, the assist logic block 108 typically comprises a keyboard interface (KI) logic circuit 120 and a modem sharing logic circuit 122. In order to achieve video playback and/or to minimize CPU's video processing time, a video encoder (VE) 118 may also be provided as an enhancement, although it is not essential. As can be appreciated by those skilled in the art, the VE circuit 118 and the video controller 116 are disposed on the same bus segment for enabling the capture of video information for remote retrieval. The software/firmware associated with the logic block 108 redirects the video information from the remotely managed server system 100 to an off-site administrator terminal (not shown), providing the system administrator with full text mode video and keyboard access. Because other functions in the server system 100 are suspended while operating in a system management mode (SMM), the system processor complex behaves as though it is a processor dedicated to the remote application task at hand (that is, as a "virtual microprocessor," depicted herein with reference numeral 102'). For convenience, the microprocessor 102 and the virtual microprocessor 102' are collectively referred to as 103.

The logic block 108 further includes a system management controller 130, including an interrupt status register 132 and an interrupt masks register 134, and an Input Output Processor (IOP) interrupt controller 136, also including an interrupt status register 138 and an interrupt mask register 140. The system management controller 130, in conjunction with an interrupt line 124 running from logic block 108 to the system processors 103, allows the remote console functionality assist logic 108 to be controlled by the system 100. Similarly, using the IOP interrupt controller 136, an IOP (not shown) controls the remote console functionality assist logic 108.

Figure 2:
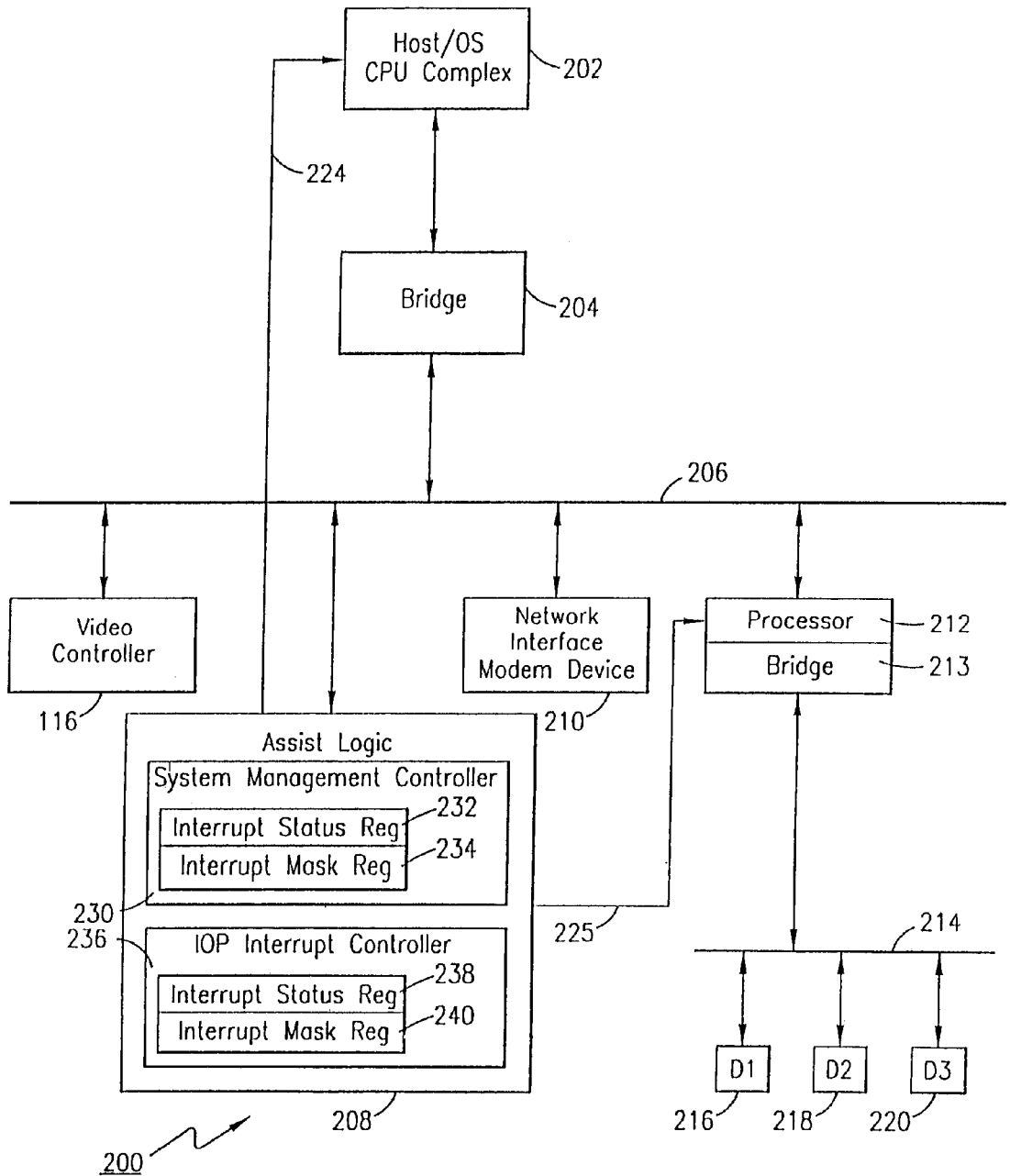
FIG. 2 depicts a block diagram of a presently preferred exemplary embodiment of a server including remote console functionality assist logic provided in accordance with the teachings of the present invention.

Referring now to FIG. 2, depicted therein is a block diagram of a presently preferred exemplary embodiment of a server 200 including a remote console functionality assist logic 208 provided in accordance with the teachings of the present invention. A host OS/CPU complex 202 is coupled via a bridge 204 to a first bus 206. Disposed on the bus 206 are the assist logic block 208, system video controller 116, a network or modem communication device 210, a bridge 213, and a processor 212. In some implementations, the processor 212 may include bridge functionality 213 so that it is bridged to a second bus 214 that interconnects a plurality of peripheral devices illustrated herein as D1 216, D2 218 and D3 220. Although in this particular exemplary embodiment the processor 212 is shown to include bridge functionality 213, one of ordinary skill in the art should realize that such bridge functionality 213 is not essential for the purposes of the present invention.

The assist logic 208 further includes a system management controller 230, including an interrupt status register 232 and an interrupt mask register 234, and an Input Output Processor (IOP) interrupt controller 236 also including an interrupt status register 238 and an interrupt mask register 240. The system management controller 230, in conjunction with an interrupt line 224 running from the assist logic 208 to the host/OS complex 202, allows the remote console functionality assist logic 208 to be controlled by the system 200. Similarly, the IOP interrupt controller 236 and an interrupt line 225 allows the processor 212 to be controlled by the assist logic 208.

The processor 212 can control not only the peripheral devices 216, 218 and 220, but as stated, also is designed to control the remote console assist logic block 208. When the server system 200 is accessed for effectuating a remote server management function, a suitable interrupt (IRQ) is generated by the logic block 208 that is associated with the remote management function. The IRQ is then routed to the processor 212 for performing the requisite remote server management function in conjunction with the assist logic 208.

Furthermore, in this exemplary embodiment, the processor 212 can also control one more peripheral devices that are disposed in front of it (i.e., connected to the first bus 206), such as the network interface or modem device 210, in addition to the assist logic block 208. Accordingly, those skilled in the art should appreciate that the processor 212 may be provided to be an Input/Output Processor (IOP) in accordance with a standardized I/O architecture known as the Intelligent Input/Output ($I_2O$) architecture. However, it is not necessary to provide an $I_2O$-compatible IOP for the purposes of the present invention. Appropriate background subject matter relating to the $I_2O$ architecture can be found in the following patent application commonly assigned to the assignee of the present invention and incorporated herein by reference: U.S. patent application Ser. No. 09/086,690, entitled "Method, System, and Apparatus for Intelligent Input/Output Device Driver Translation, and Emulation," filed May 28, 1998 (Inventor: Theodore F. Emerson).

In accordance with the teachings of the present invention, the assist logic 208 and the network/modem device 210 are provided up-stream from the vantage point of the processor 212 which may be provided with a back-up battery or an auxiliary power source (not shown). Because of the additional processing power of the processor 212, the server 200 may be provided with enhanced remote applications such as, for example, secure connections, multiple sessions, in-band connectivity, et cetera, without having to divert the processing power of the CPU complex 202. Since the assist logic 208 is independent of the host OS, the system administrator can bring the OS up or down or even reset the server 200, while remaining in control thereof through either an in-band or out-of-band connection with a remote terminal.

The assist logic 208 monitors all video activity between the host CPU complex 202 and the video controller 116. Based on the content of the individual bus cycles (e.g., PCI bus cycles) propagated on the first bus 206, the assist logic 208 monitors the operations that the system OS is performing and provides that information to the remote terminal to enable interactive user interface or for storage and playback. Some of these operations include scrolling the server console screen, clearing the screen, and drawing text, if any. After the operation is monitored, the assist logic 208 encodes the data needed to reconstruct that operation. When the collected data exceeds a select threshold, the processor 212 retrieves and processes the collected data in response to a suitable IRQ delivered by the assist logic 208. Additional subject matter relating to the capture of video information for remote retrieval may be found in the following patent applications commonly assigned to the assignee of the present invention and incorporated herein by reference: U.S. patent application Ser. No. 08/733,254, entitled "Video Eavesdropping and Reverse Assembly to Transmit Video Action to a Remote Console," (Inventors: Theodore F. Emerson, Peter J. Michaels and Jeoff M. Krontz); and U.S. patent application Ser. No. UNKNOWN, entitled "Remote Server Management Device," (Inventors: Brian Humpherys, John Butler, Siamak Tavallaei, Theodore F. Emerson and Doron Chosnek).

Figure 3:
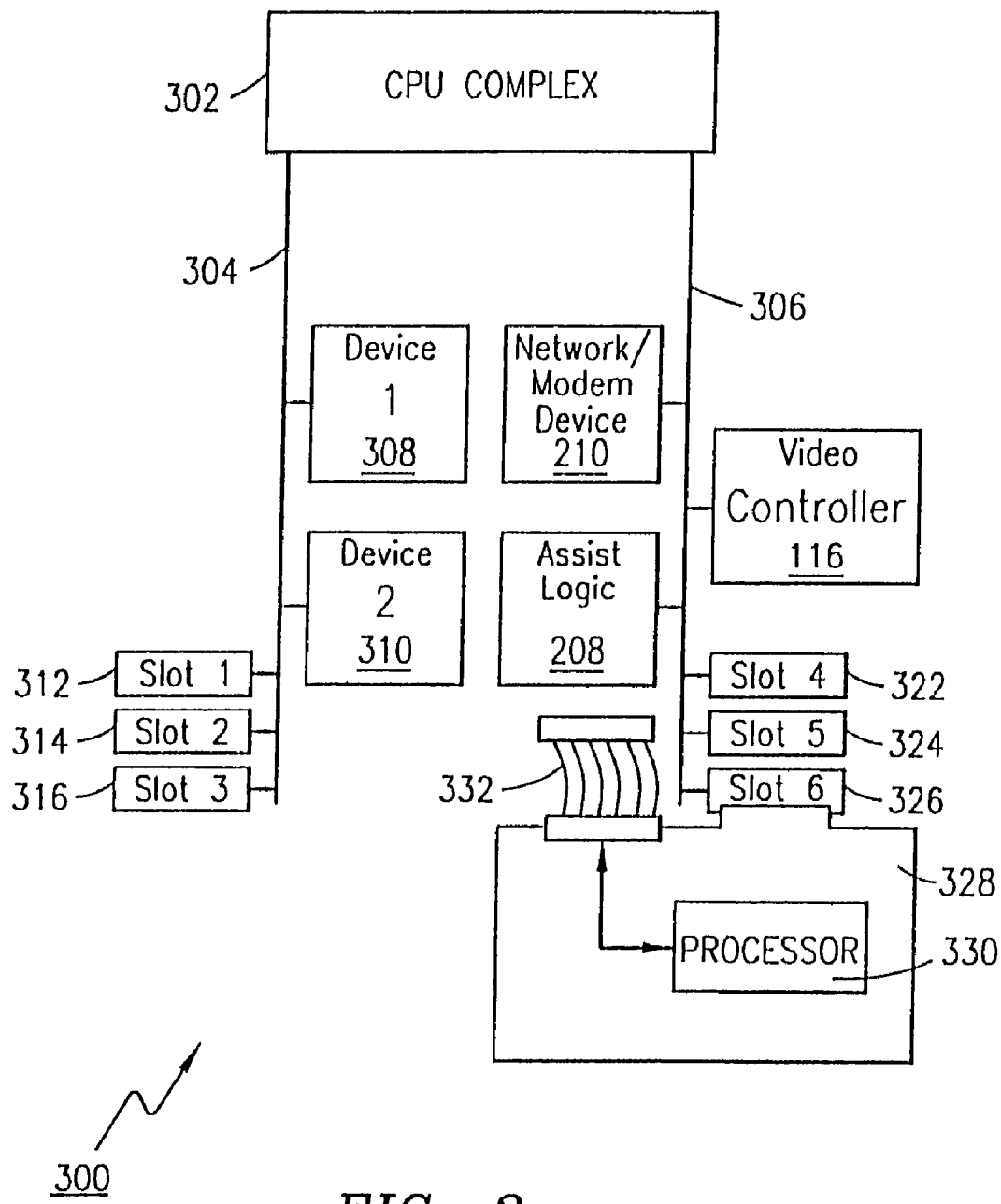
FIG. 3 depicts a block diagram of another presently preferred exemplary embodiment of a server including remote console functionality assist logic provided in accordance with the teachings of the present invention.

Referring now to FIG. 3, shown therein is a block diagram of another presently preferred exemplary embodiment of a server 300 including a remote console provided in accordance with the teachings of the present invention. An OS/CPU complex 302 of the server 300 is coupled to a first peer I/O bus 304 and a second peer I/O bus 306 via known means. In this exemplary embodiment, these peer I/O buses preferably comprise PCI buses as discussed hereinabove. Disposed on the first peer bus 304 are a plurality of peripheral devices, exemplified by device 1 (reference numeral 308) and device 2 (reference numeral 310), and a plurality of slots (for example, slot 1 (reference numeral 312), slot 2 (reference numeral 314) and slot 3 (reference numeral 316)) for providing suitable coupling means for peripheral cards (not shown).

Continuing to refer to FIG. 3, coupled to the second peer I/O bus 306 are the remote console assist logic 208, a network/modem interface device 210, the video controller 116 and a plurality of expansion slots (slots 322, 324 and 326). One of the expansion slots, for example, slot 326, is coupled with a peripheral card 328 which comprises a processor 330 for controlling the up-stream remote management devices. A connector 332 is provided for transporting various side-band signals used for controlling the up-stream devices. Once again, suitable back-up or auxiliary power sources may be provided with the card 328. Additional subject matter relating to the control of up-stream devices by the processor 330 shown herein or the processor 212 (shown in FIG. 2) may be found in the following patent applications commonly assigned to the assignee of the present invention and incorporated herein by reference: U.S. patent application Ser. No. 08/988,345, entitled "Device Proxy Agent for Hiding Computing Devices on a Computer Bus," filed Dec. 10, 1997 (Inventors: Theodore F. Emerson and Christopher J. McCarty); U.S. patent application Ser. No. 09/140,040, entitled "System and Method for Assigning and Controlling Adapters in a Computer System," (Inventors: Theodore F. Emerson and Christopher J. McCarty); and U.S. patent application Ser. No. 09/098,015, entitled "System and Method for Hiding Peripheral Devices on a Bus," filed Jun. 15, 1998 (Inventors: Siamak Tavallaei, Brian T. Purcell and Brian S. Hausauer).

It should be readily appreciated by those of ordinary skill in the art that by utilizing the Intelligent I/O architecture, both the network connection and the modem connection may be virtualized under the control of the I/O processor so that the data packets that need to forwarded to the OS and the data packets associated with out-of-band management may be appropriately sorted out as they enter the server system.

Figure 4:
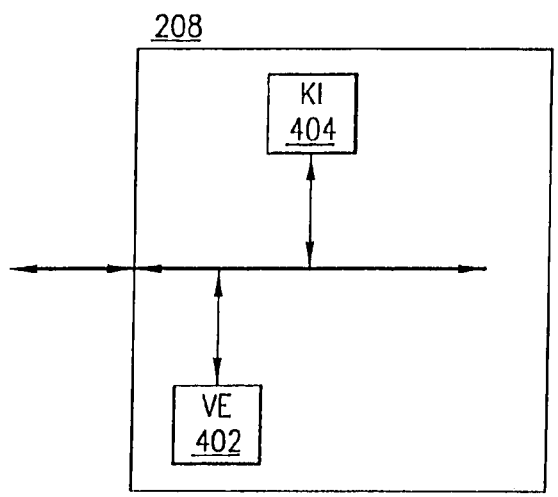
FIG. 4 is a block diagram of an exemplary embodiment of remote console functionality assist logic.

Referring now to FIG. 4, a block diagram for an exemplary embodiment of the remote console assist logic 208 is depicted in accordance with the teachings of the present invention. A video encoder (VE) 402 is disposed on the same bus segment on which the system video controller (VC) (not shown in this FIG.) is provided. The logic provided within the assist logic 208 facilitates the monitoring of all video activity between the server system CPU complex and the VC. However, it should be realized that the video encoder 402 is generally provided for enhanced functionality such as video playback, etc., as described above and is not essential for the purposes of the present invention. A keyboard interface (KI) logic block 404 is also provided within this exemplary embodiment of the assist logic 208.

Figure 5:
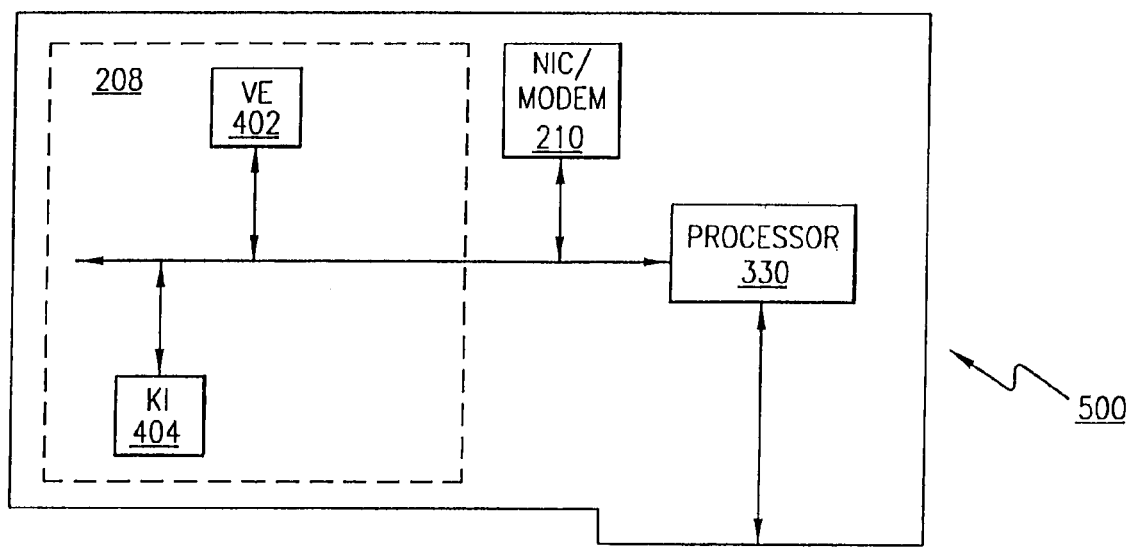
FIG. 5 illustrates an exemplary embodiment of an Input/Output (I/O) expansion card including remote console functionality assist logic in accordance with the teachings of the present invention.

Referring now FIG. 5, shown therein is a block diagram of an exemplary embodiment of an Input/Output (I/O) expansion card 500 including remote console functionality assist logic in accordance with the teachings of the present invention. The card 500 comprises the processor 330 in addition to the remote console assist logic 208 and NIC/modem device 210, coupled to a local bus segment. It should be understood that the card 330 is designed to couple to a bus that is connected to the system video controller (not shown). Also, suitable battery back-up or stand-by auxiliary power sources may be provided therewith.

Based upon the foregoing, it can be readily appreciated by those skilled in the art that the present invention provides a remote server management solution with a dedicated processor for enhanced performance and additional remote application capability. Also, because the dedicated processor could preferably be provided as an IOP amenable to the $I_2O$ architectural specification, the remote server management functionality itself may be segmented into discrete sub-blocks disposed either up-stream or down-stream from the processor (that is, in front of or behind the processor/bus-bridge structure). It should be realized upon reference hereto that under this arrangement the processor, assist logic sub-blocks and other devices (e.g., the network interface card device, modem device, et cetera) could be rendered as hot-pluggable expansion card devices whereby the system video controller remains localized as an embedded device on the system board. Additional processing power can be utilized in providing multiple session capability, in-band connectivity, security and reliability in the connection with the remote terminal.

Although certain preferred exemplary embodiments of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims. For example, as mentioned above, the remote console functionality may be provided in discrete modules as separate up-stream PCI devices controlled by the dedicated processor. Referring again to FIG. 2, the processor 212 and the peripheral devices 216-220 could be arranged into an expansion board that is coupled to a slot on the bus 206. Further, such a board may be provided with a back-up power source such that it remains operable even when the server system 200 is powered down. In a similar fashion, the peripheral board 328 (shown in FIG. 3) or board 500 (shown in FIG. 5) may also be provided with suitable back-up power or stand-by auxiliary sources. Moreover, as can be appreciated by those skilled in the art, the integration of the remote console functionality and associated logic may be accomplished in various modular combinations such that various structural variations are possible in terms of the modules' location with reference to the controlling processor. Accordingly, all such modifications and rearrangements should be deemed to exist within the scope of the present invention which is defined by the following claims.

What is claimed:

1. A managed computer system, comprising:
   an expansion slot;
   a bus interconnected with the expansion slot;
   an expansion board comprising a processor, the board disposed in the expansion slot; and
   a remote console functionality assist logic structure controlled by the processor to provide video signals generated by the managed computer system to a remote computer system and configured to operate independently of a central processing unit (CPU) of the managed computer system.

2. The computer system as set forth in claim 1, wherein the bus comprises a Peripheral Component Interconnect (PCI) bus.

3. The managed computer system as set forth in claim 1, wherein the remote console functionality assist logic structure comprises a video encoder for encoding video signals transmitted between a video controller and a system processor associated with the managed computer system.

4. The computer system as set forth in claim 1, wherein the remote console functionality assist logic structure comprises a keyboard interface logic circuit.

5. A managed computer system, comprising:
   an Input/Output (I/O) processor disposed on a bus;
   a video controller disposed on the bus; and
   a remote console functionality assist logic structure disposed on the bus and configured to operate notwithstanding whether a central processing unit (CPU) of the managed computer system malfunctions, the structure controlled by the processor to provide video signals of the video controller to a remote computer system.

6. The computer system as set forth in claim 5, wherein the bus comprises a Peripheral Component Interconnect (PCI) bus.

7. The managed computer system as set forth in claim 5, wherein the remote console functionality assist logic structure comprises a video encoder for encoding video signals of the video controller.

8. The computer system as set forth in claim 5, wherein the remote console functionality assist logic structure comprises a keyboard interface logic circuit.

9. A managed computer system, comprising:
   an expansion slot;
   a bus adapted to connect a plurality of devices and the expansion slot;
   an add-in board disposed in the expansion slot, the add-in board comprising an on-board processor; and
   a remote server console device adapted to communicate on the bus without diverting resources from a system processor of the managed computer system, the remote server console device having a remote console functionality assist logic structure controlled by the on-board processor.

10. The computer system of claim 9 wherein the add-in board comprises a connector that facilitates the transmission of control signals associated with the processor to the remote server console device.

11. The computer system of claim 9 wherein the remote console functionality assist logic structure comprises a system management controller.

12. The computer system of claim 9 wherein the remote console functionality assist logic structure comprises an interrupt controller associated with the processor.

13. The computer system as set forth in claim 9, wherein the add-in board comprises a back-up power source.

14. The managed computer system as set forth in claim 9, wherein the remote console functionality assist logic structure comprises a video encoder for encoding video signals of a video controller associated with the computer system.

15. The computer system as set forth in claim 9, wherein the remote console functionality assist logic structure comprises a keyboard interface logic circuit.

16. A remote server management control system for a computer system, the computer system comprising a bus adapted to connect a plurality of devices and an expansion slot, the remote server management control system comprising:
   an add-in board disposed in the expansion slot, the add-in board comprising a processor; and
   a remote server console device adapted to communicate on the bus, the device comprising a remote console functionality assist logic structure controlled by the processor and configured to operate independently of a central processing unit (CPU) of the computer system.

17. The remote server management control system as set forth in claim 16, wherein the add-in board comprises a connector that facilitates the transmission of control signals associated with the processor to the remote server console device.

18. The remote server management control system as set forth in claim 16, wherein the remote console functionality assist logic structure comprises a system management controller.

19. The remote server management control system as set forth in claim 16, wherein the remote console functionality assist logic structure comprises an interrupt controller for the processor.

20. The remote server management control system as set forth in claim 16, wherein the add-in board comprises a back-up power source.

21. The remote server management control system as set forth in claim 16, wherein the remote console functionality assist logic structure comprises a video encoder for encoding video signals of a video controller associated with the computer system.

22. The remote server management control system as set forth in claim 16, wherein the remote console functionality assist logic structure comprises a keyboard interface logic circuit.

23. A remotely managed computer system, comprising:
   a system processor operably coupled to an Input/Output (I/O) bus;
   a video controller disposed on the bus to provide video signals to the remotely managed computer system; and
   a remote console functionality assist logic structure disposed on the bus, the logic structure adapted to capture the video signals of the video controller and direct video information to a remote computer system notwithstanding whether a system processor of the remotely managed computer system is functioning properly.

24. The computer system as set forth in claim 23, wherein the bus comprises a Peripheral Component Interconnect (PCI) bus.

25. The remotely managed computer system as set forth in claim 23, wherein the remote console functionality assist logic structure comprises a video encoder for encoding video signals of the video controller.

26. The computer system as set forth in claim 23, wherein the remote console functionality assist logic structure comprises a keyboard interface logic circuit.

27. The computer system as set forth in claim 23, wherein the remote console functionality assist logic structure a system management controller.

28. The computer system as set forth in claim 23, comprising an Input/Output processor adapted to control the remote console functionality assist logic structure.

29. The computer system as set forth in claim 23, wherein the remote console functionality assist logic structure comprises an interrupt controller for the Input/Output processor.

30. A method of remotely monitoring a computer system, comprising the acts of:
    establishing a connection between the computer system and a remote terminal; and
    controlling a remote console functionality assist logic structure with an Input/Output processor, the remote console functionality assist logic structure being associated with the computer system and configured to operate without regard to whether a central processing unit (CPU) of the computer system is malfunctioning.

31. The method as set forth in claim 30, wherein the act of establishing comprises the act of setting up an in-band connection.

32. The method as set forth in claim 30, wherein the act of establishing comprises the act of setting up an out-of-band connection.

33. A method of providing remote console functionality assist logic in a computer system, the computer system comprising a bus that is adapted to connect a plurality of devices and an expansion slot, the method comprising the acts of:
    providing the computer system with an add-in board disposed in the expansion slot, the add-in board comprising a processor configured to operate independently of a central processing unit (CPU) of the computer system; and
    providing the computer system with a remote server console device adapted to communicate on the bus, the remote server console device comprising a remote console functionality assist logic structure, wherein the operation of the remote server console device is controlled by the processor.

34. The method as set forth in claim 33, comprising the act of providing the add-in board with a connector that facilitates the transmission of control signals associated with the processor to the remote server console device.

35. The method as set forth in claim 33, comprising the act of providing the remote console functionality assist logic structure with a system management controller.

36. The method as set forth in claim 33, comprising the act of providing the remote console functionality assist logic structure with an I/O processor interrupt controller.

37. The method as set forth in claim 33, comprising the act of providing the add-in board with a back-up power source.

38. The method as set forth in claim 33, comprising the act of providing the remote console functionality assist logic structure with a video encoder for encoding video signals of a video controller associated with the computer system.

39. The method as set forth in claim 33, comprising the act of providing the remote console functionality assist logic structure with a keyboard interface logic circuit.

40. A method of providing remote server management control functionality in a computer system, the method comprising the acts of:
    providing the computer system with a remote console functionality assist logic structure adapted to monitor activities in the computer system and provide data to a remote user; and
    providing a processor contained on an add-in board mounted in an expansion slot on a communication bus in the computer system to control the remote console functionality assist logic.

41. The method as set forth in claim 40, comprising the act of providing the add-in board with a connector that facilitates the transmission of control signals associated with the processor to the remote console functionality assist logic structure.

42. The method as set forth in claim 40, comprising the act of providing the remote console functionality assist logic structure with a system management controller.

43. The method as set forth in claim 40, comprising the act of providing the remote console functionality assist logic structure with an interrupt controller for the processor.

44. The method as set forth in claim 40, comprising the act of providing the add-in board with a back-up power source.

45. The method as set forth in claim 40, comprising the act of providing the remote console functionality assist logic structure with a video encoder for encoding video signals of a video controller associated with the computer system.

46. The method as set forth in claim 40, comprising the act of providing the remote console functionality assist logic structure with a keyboard interface logic circuit.

47. A method of transmitting video data between a remotely managed computer system and a remote computer system, comprising the acts of:
    using a remote console functionality assist logic structure disposed on a bus and controlled by an Input/Output processor configured to operate independently of a central processing unit (CPU) of the remotely managed computer system to provide video signals of a video controller of the remotely managed computer system to the remote computer system.

48. The method as set forth in claim 47, wherein the bus comprises a Peripheral Component Interconnect (PCI) bus.

49. The method as set forth in claim 47, comprising the act of using a video encoder of the remote console functionality assist logic structure for encoding video signals of the video controller.

50. The method as set forth in claim 47, wherein the remote console functionality assist logic structure comprises a keyboard interface logic circuit.

* * * * *

UNITED STATES PATENT AND TRADEMARK OFFICE
CERTIFICATE OF CORRECTION

PATENT NO. : 7,447,818 B2  
APPLICATION NO. : 10/716144  
DATED : November 4, 2008  
INVENTOR(S) : Theodore F. Emerson et al.

It is certified that error appears in the above-identified patent and that said Letters Patent is hereby corrected as shown below:

In column 11, line 5, in Claim 27, after "structure" insert -- comprises --.

Signed and Sealed this

Nineteenth Day of May, 2009

JOHN DOLL  
*Acting Director of the United States Patent and Trademark Office*